United States Patent [19]

Scholl

[11] 4,074,794
[45] Feb. 21, 1978

[54] HEIGHT INDICATOR AND CONTROL FOR FORK LIFT TRUCKS

[75] Inventor: Rolland D. Scholl, Peoria, Ill.

[73] Assignee: Towmotor Corporation, Mentor, Ohio

[21] Appl. No.: 627,828

[22] Filed: Oct. 31, 1975

[51] Int. Cl.² ............................................. G05D 3/08
[52] U.S. Cl. .................................................. 187/29 A
[58] Field of Search ............... 187/9 R, 9 E, 1 R, 34, 187/35, 29 R, 29 A; 318/265, 266, 466, 467, 468, 490, 600, 601, 626, 652, 139; 33/129, 172 E, 340, 73, 324; 91/1, 361, 363

[56] References Cited

U.S. PATENT DOCUMENTS

| 3,795,851 | 3/1974 | Gage et al. | 318/600 |
| 3,812,589 | 5/1974 | Schultheis | 33/129 |
| 3,977,497 | 8/1976 | McMurry | 187/29 A |

Primary Examiner—Robert K. Schaefer
Assistant Examiner—Michael K. Mutter
Attorney, Agent, or Firm—Phillips, Moore, Weissenberger, Lempio & Majestic

[57] ABSTRACT

Electrically operated means for indicating the fork height on a fork lift truck are shown. Heights less than a predetermined minimum are not shown in order to provide a better indication at heights which are difficult for the operator to estimate. Control means are also shown for automatically stopping the forks at a height presettable by digital and by analog means.

4 Claims, 5 Drawing Figures

Fig_1_

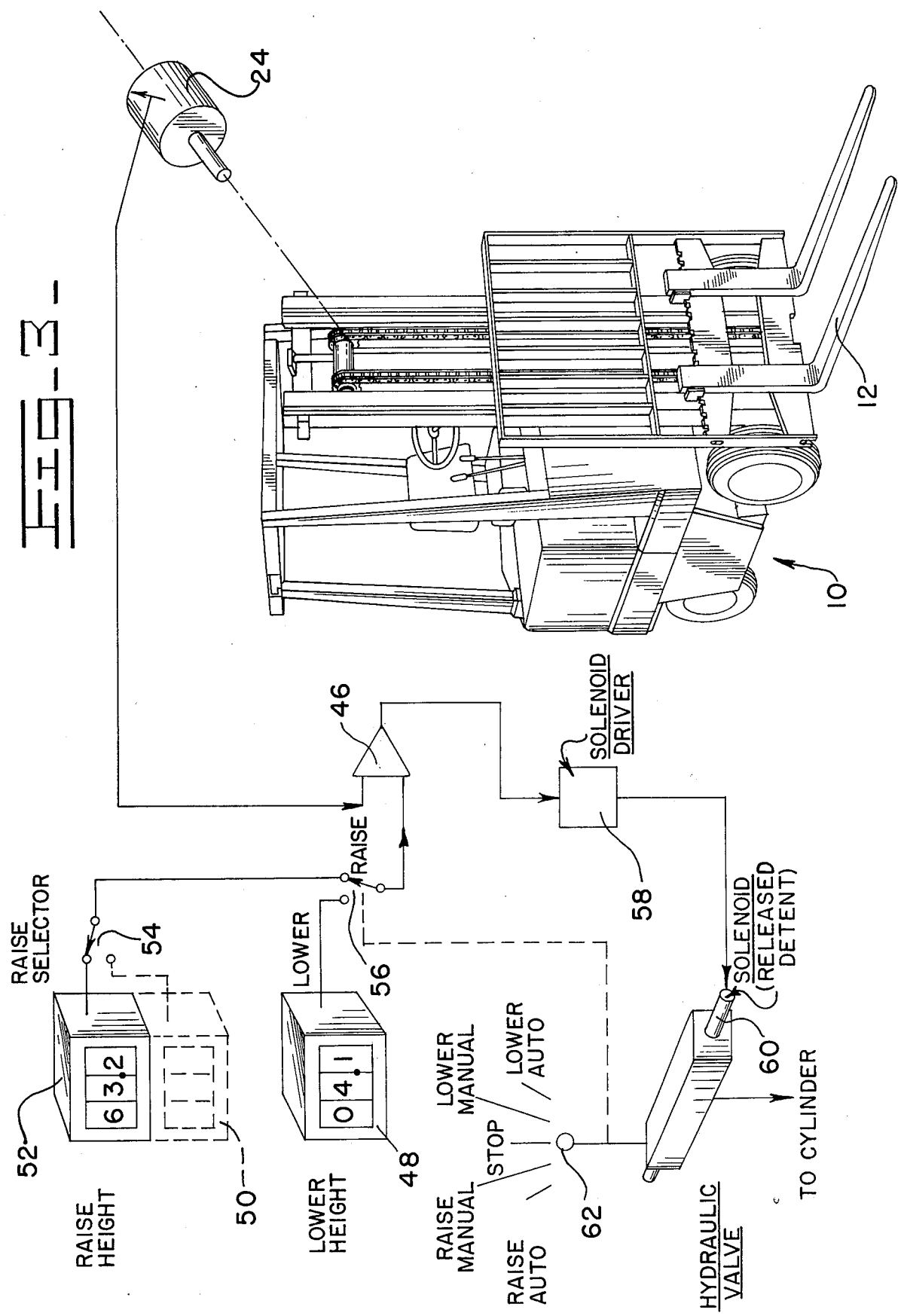

HEIGHT INDICATOR AND CONTROL FOR FORK LIFT TRUCKS

BACKGROUND OF THE INVENTION

When a fork lift truck is operated in a warehouse with narrow aisles and high shelves it often becomes quite difficult even for experienced operators to accurately align the forks in a vertical direction with the narrow space between a shelf and a pallet bottom into which the forks are to be inserted. Damage to the shelving and to the pallets often results. Inasmuch as fork lift trucks are usually battery-powered and therefore have a convenient source of electrical power readily available, it is desirable to provide simple electronic means to give the operator at least a clear height indication in as large a scale as possible, and preferably to give the operator a way to accurately and automatically stop the forks at a predetermined height.

SUMMARY OF THE INVENTION

The present invention provides simple and effective means for indicating and automatically controlling the fork height of a fork lift truck.

In accordance with one aspect of the invention, the indicating function may be carried out by way of a dial-type meter with a special circuit which prevents any registration on the meter until the forks have reached a height where their position becomes difficult to accurately estimate visually. In this manner, maximum use is made of the indicating range available on the meter dial.

In accordance with a second aspect of the invention preset counters connected to the fork drive mechanism coact with a comparator and an electromechanical fork control lever release to provide a plurality of switchable or sequenceable stops of the forks at presettable heights.

In accordance with a third aspect of the invention, a rotary element of the fork drive mechanism is used to generate pulses which operate a digital counting apparatus which provides both indicating and control means for the fork operation.

It is therefore the primary object of the invention to provide an electrical height indicating and control device for the forks of a fork lift truck.

It is another object of the invention to provide a simple yet effective means for displaying height information to the fork lift truck operator when the fork are at an elevation where their visual alignment with storage rack shelves becomes difficult.

It is still another object of the invention to provide a height control device for fork lift trucks which provides for selectable automatic stops of the forks at a plurality of presettable heights.

It is yet another object of this invention to provide a digital system for simultaneously controlling and displaying fork height on a fork lift truck.

BRIEF DESCRIPTION OF THE DRAWINGS

FIG. 3 is a block diagram showing the operation of the multistop embodiment of the control system;

DESCRIPTION OF THE PREFERRED EMBODIMENTS

Figure 1:
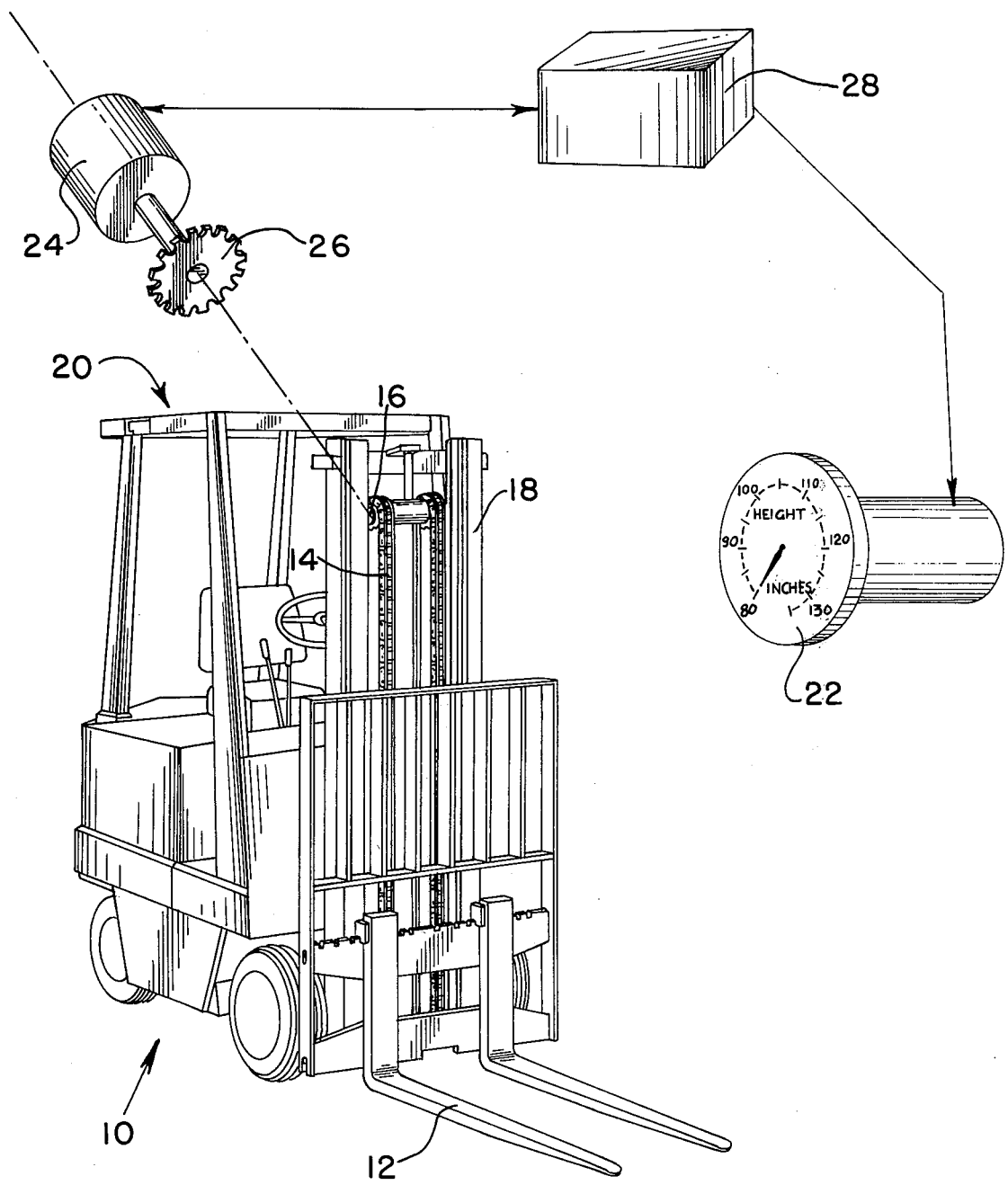
FIG. 1 is a schematic representation showing the indicating system of this invention as it would be applied to a fork lift truck of conventional construction.

FIG. 1 shows a fork lift truck 10 of conventional construction. A typical vehicle of this kind is propelled by an electric or internal combustion motor. In either case it is equipped with one or more batteries (not shown) which provide a convenient source of DC electric power. Conventionally, the forks 12 are raised and lowered by chains 14 guided by sprocket wheels such as 16 and driven by a hydraulic system powered by the motor (not shown) of the truck 10. When fully raised, the forks 12 are lifted on telescoping members of the support structure 18 to levels very considerably above the top of the operator's cab 20 where they are quite difficult to observe and align with any accuracy.

In the first aspect of the invention, a clear indication of the fork height is provided to the operator by mounting a height indicator 22 at a convenient place within the operator's view, e.g. on the support structure 18. A potentiometer 24 may be mounted on the shaft of any sprocket in the driving or guiding mechanism of chains 14 or it may be mounted on support structure 18 and may itself be provided with a sprocket 26 adapted to engage the chain 14. The potentiometer 24 is connected to the indicator 22 by an electric circuit 28 shown in more detail in FIG. 2.

Figure 2:
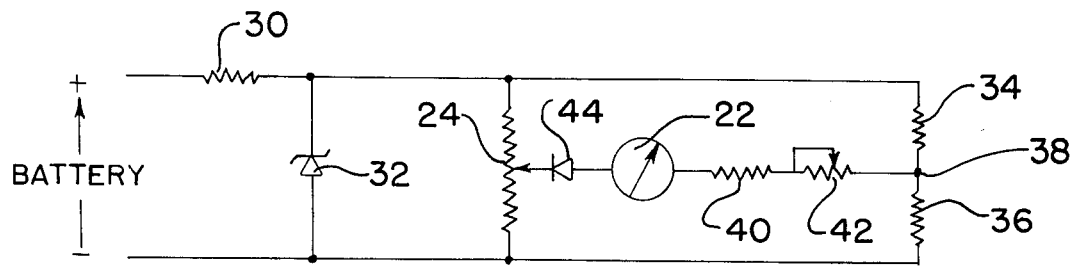
FIG. 2 is a circuit diagram showing the range restricting circuit used in connection with the system of FIG. 1.

In the circuit of FIG. 2, DC potential voltage-regulated by current limiting resistor 30 and Zener diode 32 is applied to potentiometer 24. Range limiting resistors 34, 36 are connected in parallel with potentiometer 24 and define, at their junction 38, the potential applied to the right side of indicator 22 through calibrating resistor 40 and trimming potentiometer 42. As long as the potential picked off by the wiper of potentiometer 24 is more positive than the potential of junction 38, the indicator 22 is reversebiased and does not respond. When the wiper potential is more negative than junction 38, however, the indicator 22 registers an indication proportional to the position of the wiper of potentiometer 24. A diode 44 may be provided, if necessary, to protect the indicator mechanism from reverse bias damage.

Referring back now to FIG. 1, the dial of indicator 22 is shown as indicating an 80–135 inch fork height range. The lower end of this range is determined by the ratio of resistors 34, 36 of FIG. 2, while the upper end of the range represents the lowermost position of the wiper of potentiometer 24 and is determined by the values of calibration and trim resistors 40, 42.

Turning now to FIG. 3, the conventional fork lift truck is again shown at 10. The potentiometer 24 is operatively associated with the truck 10 in the same manner as described above in connection with FIGS. 1 and 2. However, in this instance, its wiper is connected to one input of a comparator 46. The other input to comparator 46 is derived from a selected one of height selectors 48, 50, 52, depending on the position of raise selector switch 54 and raise-lower switch 56. Each of the height selectors 48, 50, 52 consists of a potentiometer connected directly across the regulated power supply in the same manner as potentiometer 24 in FIG. 2. The height selectors 48, 50, 52 may be of any conventional analog or digital type, as long as their outputs are representative of the selected height as displayed on the face thereof. Although two height selectors are shown on FIG. 3 for the raising function and one for the lowering function, it will be understood that any desired number may be used for each function.

Figure 5:
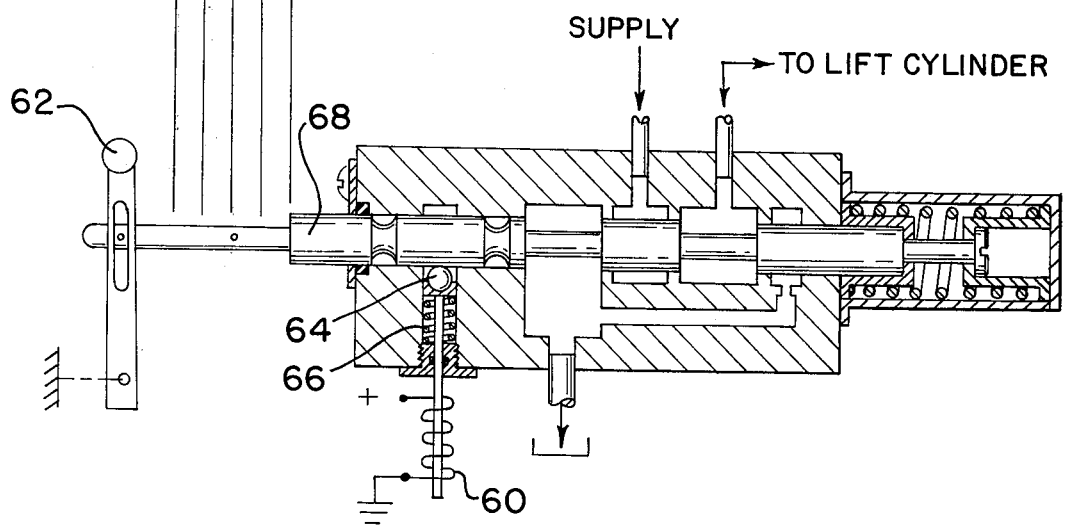

The comparator 46 may be of any commercially available type which produces an output when the two input potentials are substantially equal. The output of comparator 46 is used to energize a solenoid driver circuit 58 of conventional construction which actuates the detent release solenoid 60 shown in more detail in FIG. 5.

As indicated in FIG. 3, the fork control lever 62 of the truck 10 typically has five positions: stop, raise manual, lower manual, raise automatic, and lower automatic. The control lever 62 is spring-biased into the "stop" position; however, in the two extreme "automatic" positions, the control 62 is held against the spring bias by a detent 64 shown schematically in FIG. 5. The detent 64 is urged into locking position by spring 66 but can be released either by a purposeful push on lever 62, or in accordance with the invention by momentarily actuating solenoid 60 to withdraw detent 64 from engagement with the hydraulic valve slide 68 which controls the hydraulic fluid supply to the fork drive of the truck 10.

In operation, the operator selects, by way of raise selector switch 54, the desired raise height from the various standard heights preset on height selectors 50, 52 and moves control lever 62 to the "raise automatic" position. The detent 64 engages and holds control lever 62 in that position until the selected height is reached. At that point, the output of the selected height selector 50 or 52 equals the output of potentiometer 24; comparator 46 energizes solenoid drive 58 to actuate solenoid 60; detent 64 is momentarily withdrawn; and control lever 62 snaps back to the "stop" position, halting the forks 14.

After the operator has picked up or shelved the load, as the case may be, by manipulating control lever 62 to and from the manual positions, the operator moves control lever 62 to the "lower automatic" position. This engages detent 64 and switches raise-lower switch 56 (which is mechanically connected to control lever 62) to the "lower" position where it feeds the output of height selector 48 to comparator 46. When the forks 14 (in the example shown in FIG. 3) reach a level 4.1 inches from the floor, the detent 64 is released by solenoid 60, and the operator resumes such manual control as the situation may require.

Figure 4:
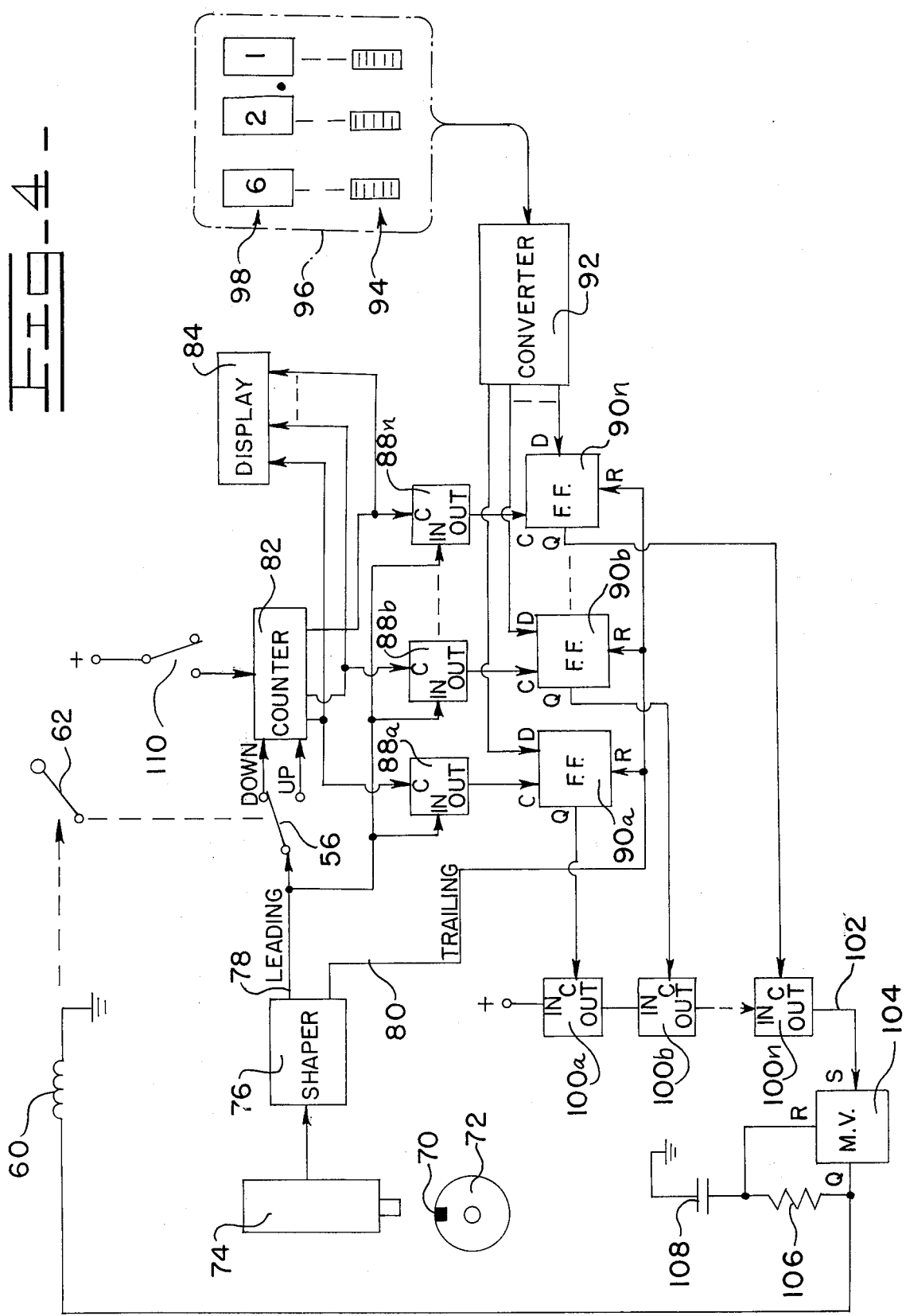
FIG. 4 is a block diagram showing a digital embodiment of the control system; and, FIG. 5 is a schematic representation showing the control lever release and direction-sensing mechanisms.

FIG. 4 shows an example of how the invention could be carried out in digital form. The embodiment of FIG. 4 is meant to be illustrative only and may, within the confines of the invention, use any desired logic circuitry within the state of the art.

In the embodiment of FIG. 4, a magnetic element 70 is affixed to a conveniently located rotary member 72 of the fork drive mechanism, e.g. a chain guide sprocket wheel. A pickup 74 is positioned adjacent the wheel to produce a current pulse each time the magnetic element 70 passes by the pickup 74. These pulses are converted to a uniform amplitude shape and duration by a conventional pulse shaper 76, which produces an output spike at the leading edge of each pulse on line 78, and at the trailing edge of each pulse on line 80.

The spikes on line 78 are connected through the raise-lower switch 56 associated with fork control lever 62 to the up-count and down-count inputs, respectively, of a bidirectional binary counter 82. The counter 82, as shown on FIG. 4, is of the type whose outputs represent, in binary form, the total number of counts stored in the counter at any given time. For simplicity, only three outputs are shown although there would normally be more.

The binary outputs of counter 82 may be connected to an appropriate fork height display unit 84 capable of translating binary information into a decimal numeric display. Units of this type using light-emitting diodes are readily commercially available.

The binary outputs of counter 82 are also applied to the control terminals of electronic switches 88a, 88b, 88n which, when closed, convey the leading edge spikes from line 78 to the clock inputs of flip flops 90a, 90b, 90n, respectively. The enabling inputs of flip flops 90a, 90b, 90n are energized in accordance with the binary output of decimal-to-binary converter 92, whose decimal input is determined by the setting of the selector switches 94 of height selector 96. The switch settings may be visually displayed by indicators 98.

The "Q" outputs of the flip flops 90a, 90b, 90n are applied, respectively, to the control inputs of electronic switches 100a, 100b, 100n. Inasmuch as these electronic switches are connected in series, a positive potential appears on line 102 whenever the binary output from converter 92 is identical to the binary output from counter 82, i.e. when the forks 14 are at the level preset on selector switches 94. This operates one-shot multivibrator 104 to actuate detentreleasing solenoid 60 for a short period of time determined by the values of resistor 106 and capacitor 108.

The trailing edge spikes appearing on line 80 are applied to the reset terminals of flip-flops 90a, 90b, 90n to reset them after each count. A reset switch 110 may be provided on the supporting structure 18 of the truck 10 so as to be tripped by the forks 14 at a predetermined reference level corresponding to a zero count of counter 82, so as to minimize problems due to miscounts of the counter 82.

Other appropriate logic arrangements to carry out the purposes of the circuit of FIG. 4 will readily appear to those skilled in the art, and they are deemed to be included in this invention.

I claim:

1. Height control apparatus for fork lift trucks, comprising:
   a. signal-generating means operatively associated with the fork lifting mechanism of said fork lift truck to provide an electrical signal representative of actual fork height;
   b. presettable height selection means for producing a height selection signal;
   c. comparator means connected to said signal-generating means and said height selection means for comparing said actual fork height signal and said height selection signal;
   d. fork control means on said fork lift truck for raising and lowering said forks, said fork control means being normally biased into a fork stopping position but being releasably holdable in raising or lowering positions by locking means;
   e. electromagnetic means associated with said fork control means for releasing said locking means; and,
   f. means connecting said comparator means and said electromagnetic means for actuating said electromagnetic means to release said locking means when the actual height of said forks correspond to the height selected by said height selection means.

2. The apparatus of claim 1, which includes a plurality of said presettable height selection means, and in which said fork control means include switch means operatively associated therewith, said switch means being arranged to connect one of said plurality of height selection means to said comparator means while said forks are being raised, and another while said forks are being lowered.

3. The apparatus of claim 2, further comprising selector switch means for selectively connecting different ones of said height selection means to said comparator means.

4. The apparatus of claim 1, in which said signal generating means include magnetic means arranged to move with said fork lifting mechanism, pick-up means located adjacent said fork lifting mechanism for generating electrical pulses upon movement of said magnetic means therepast, and pulse counting means arranged to count said pulses and provide a digital output representative of total pulse count; and in which said height selection means produce a selectable digital output which equals the output of said pulse counting means when the actual height of said forks corresponds to the height selected by said height selection means.

* * * * *